Nov. 6, 1951    W. C. STAMMER ET AL    2,574,357
METHOD OF AND APPARATUS FOR FORMING SOLDER PELLETS
Filed May 5, 1948    2 SHEETS—SHEET 2
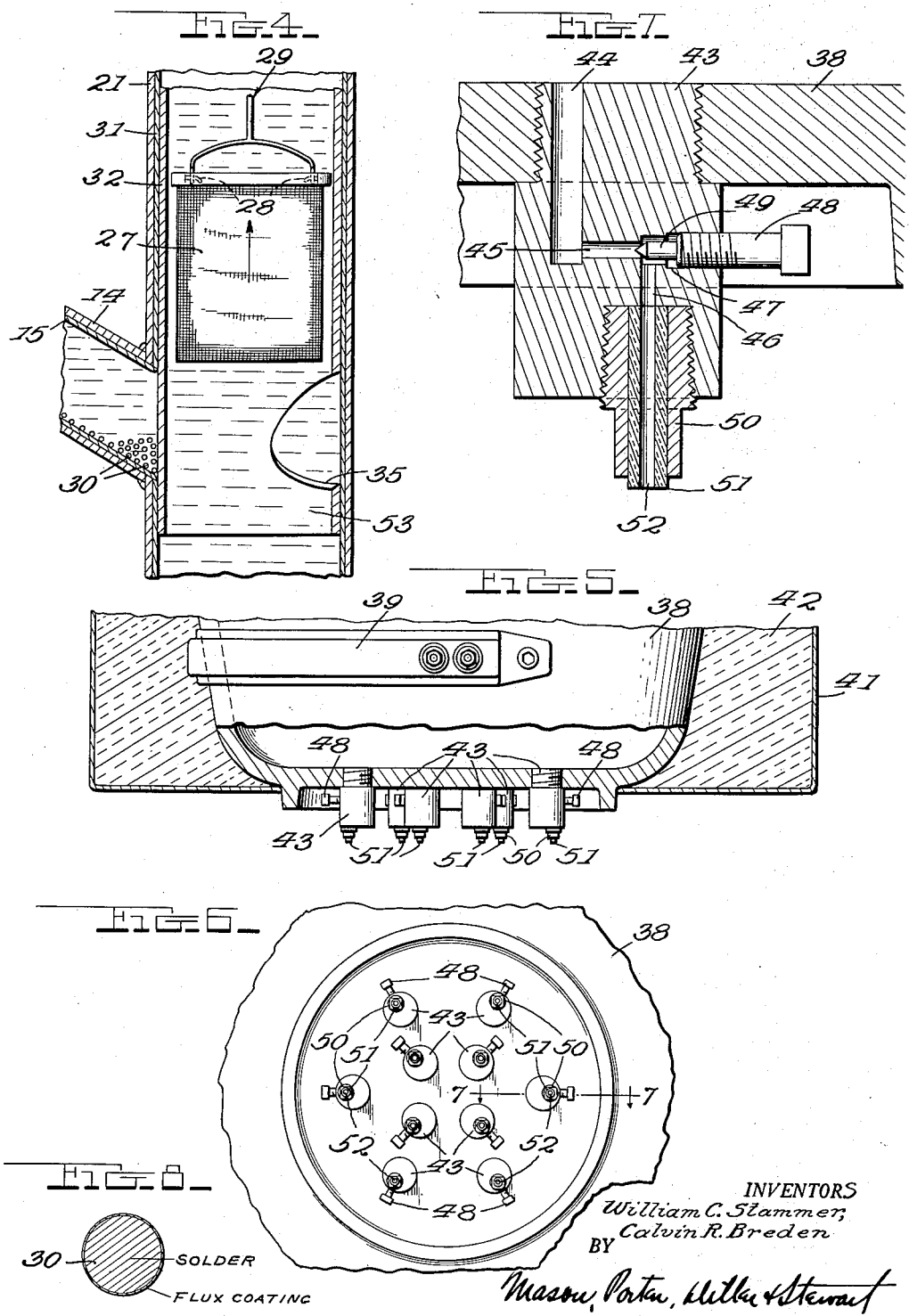

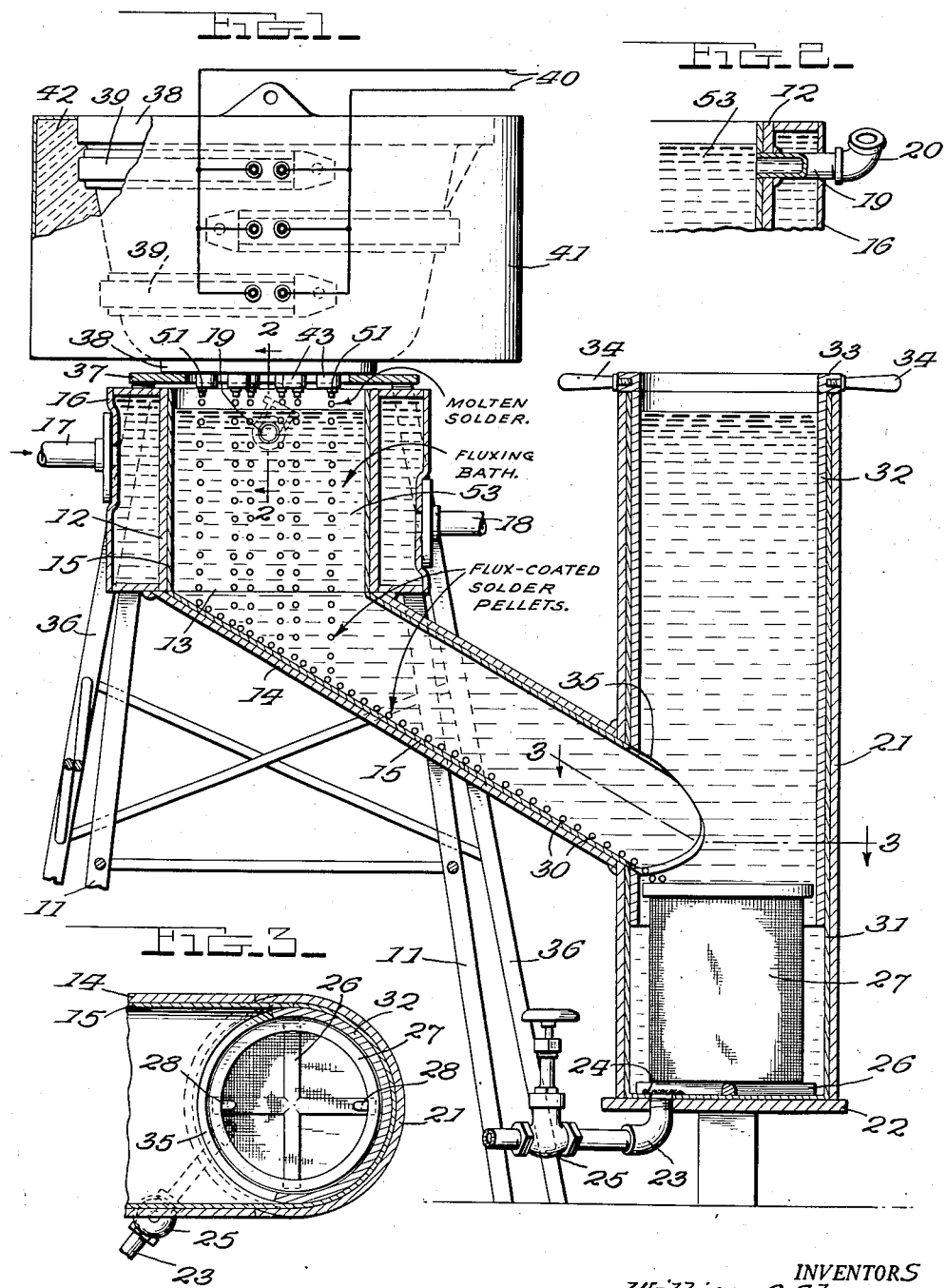

UNITED STATES PATENT OFFICE 2,574,357

METHOD OF AND APPARATUS FOR FORMING SOLDER PELLETS

William C. Stammer, Glenview, and Calvin R. Breden, La Grange, Ill., assignors to Continental Can Company, Inc., New York, N. Y., a corporation of New York Application May 5, 1948, Serial No. 25,216

7 Claims. (Cl. 18—2.4)

The specification which follows relates to a novel method and apparatus for making solder pellets. Such pellets have found extensive use and are quite advantageous for soldering metal seams and junctures in narrow or restricted places where it is difficult to control the application of limited amounts of molten solder or drop solder which is usually cut from wire solder and whose sharp edges and cylindrical shape make mechanical feeds uncertain and rolling erratic. By providing solder in pellet form, the desired number and size of pellets required for the soldering operation can be taken and delivered to the place where the soldering is to be done. The pellets may be rolled or shaken into final position after which moderate heating of the metal parts will melt the pellets and cause them to flow directly into the seam. Small valves, fittings or closures are thus effectively assembled in the ends of metal containers.

The production of such solder pellets has, however, presented numerous difficulties. Forming them by casting is slow and expensive. Solder has never been made successfully into pellet form or shot by dropping through a cooling medium such as air or water. While this method is satisfactory with lead and isothermal lead alloys in general, the presence of as little as .01% of tin has been found to prevent the formation of round shot. In like manner, the presence of tin serves to reduce the surface tension of the molten mass and to promote a wetting of the metal surface with which it comes in contact. These characteristics are well described in the patent of Olin and Smith, dated April 5, 1938, No. 2,113,279 for a process for the manufacture of shot.

In a word, the preferred practice in forming lead shot is to increase the hardness by the addition of a minor proportion of arsenic or antimony. The lead and its alloys used for shot have a relatively short range of congelation. This is materially above that of solder. On the contrary, it is a well-known fact that tin-lead solder alloys melt at materially lower temperatures than do the lead alloys used for lead shot. Consequently, the production of solder pellets must be carried out at much lower temperatures and solidification may occur over a wider range. One result of this is a tendency for the constituent ingredients of solder to crystallize separately and thus interfere with the formation of acceptable homogeneous pellets.

We have succeeded in forming satisfactory pellets of solders containing tin combined with other metals such as lead or silver, in a wide range of proportions. By pellets we refer to spheroidal masses of generally uniform weight and capable of being handled in measured quantities and rolled or shaken into small crevices, such as metal seams or junctures preliminary to fusion. By our method, pellets are produced which are uniform in size, 85% being within the allowed tolerances. This result is in part obtained by special precautions taken to prevent the wetting of contact surfaces by the molten drops during their formation.

The form is generally spheroidal and can permit their ready placement in the restricted area intended to be soldered.

It is characteristic of these pellets that the surface is clean and unoxidized and the component ingredients are not segregated when congealed.

Considerable importance lies in a close control of temperatures of the molten solder; when the drops are formed it must be near the liquidus point to facilitate congelation promptly to prevent segregation of the component metals after the molten drops of solder approximate a spherical shape.

The medium in which the pellets are cooled (the coolant) must have a density or a viscosity such that the fall of the molten drop is retarded while it acquires the desired shape. Further, the coolant contains a flux compound. This protects the surface and remains as a dried coating or deposit which serves as a flux in the soldering operation.

It is, therefore, a purpose of our invention to produce improved pellets of solder by dropping the melted solder in the form of drops into a liquid medium under such conditions as to cause them to take spheroidal pellet form and to be congealed.

It is also a purpose of our invention to control the fall of the drops into and through the coolant during the forming of the pellets.

A further purpose of our invention is to check the oxidation of the pellet surfaces and to provide a flux coating for the solder operation.

It is an object of our invention to provide an improved machine to carry out the above purposes.

It is likewise the object of our invention to regulate the size of the separate pellets.

A still further object of our invention is to sustain the molten drops during the formation of the spheroids and during congelation.

Another object of our invention is to maintain the surfaces of the pellets unoxidized and give them a flux coating.

Our improved machine will carry out the above operations continuously and effectively.

In order that our invention may be adequately understood, we have shown on the accompanying drawings the preferred form of a machine embodying the invention and carrying it out as illustrated on the following drawings in which Fig. 1 is a side view, partly in vertical section of the machine for carrying out our method;

Fig. 2 is a fragmentary vertical section of the tank overflow shown on the line 2—2 of Fig. 1;

Fig. 3 is a horizontal section of the receiving means shown on the line 3—3 of Fig. 1;

Fig. 4 is a vertical section of the discharge well and the collecting basket;

Fig. 5 is an enlarged side elevation partly in vertical section of the solder melting crucible;

Fig. 6 is a bottom view of the crucible;

Fig. 7 is an enlarged vertical section of one of the discharge nozzles taken on the line 7—7 of Fig. 6; and Fig. 8 is an axial cross-section of a pellet with its flux coating.

In the form of the invention illustrated, the stand 11 supports a cooling tank 12. The tank has an open bottom 13. From the bottom 13 there is a chute 14 which is inclined to one side of the stand 11. The tank and chute are both made of metal preferably a corrosion resistant metal, such as Monel metal or an analogous stainless steel.

Both the tank and the chute are also given continuous lead linings 15 which will be acid resistant.

The tank 12 is surrounded by a water jacket 16. This jacket has an inlet 17, and an outlet 18. Cooling water is circulated through the water jacket at a selected temperature so that the bath in the tank is cooled and the differential between the temperature of the molten solder and the bath in the tank is maintained as desired.

An overflow pipe 19 extends from within the tank through the water jacket as shown in Fig. 2. This pipe has an elbow 20 which is adjustable. In this manner the overflow from the tank and the distance of the drop of the metal through air is controlled precisely by tilting or adjusting the angle of the elbow 20 in the overflow pipe 19.

The lower end of the chute 14 leads into a well 21. This is a compartment having an open upper end above the level of the quenching liquid in the tank 12. The bottom 22 of the well has a drain pipe 23. A strainer 24 overlies the connection of the drain pipe to the well. A valve 25 is provided to control the discharge from the drain pipe 23.

A stand 26 rests on the bottom 22 and supports an open mesh basket 27. The top of the basket 27 is below the discharging point of the chute 14 into the well 21. As is shown in Fig. 3, the basket 27 has a pair of lugs 28 on opposite sides to be used for applying a yoke 29 by which the basket 27 may be lifted out of the well when it has received a quantity of the completed pellets. The pellets 30 are shown in Fig. 1 as rolling by gravity through the chute 14 and into the basket 27.

The well has a complete inner lining 31 of lead for the purpose of preventing corrosive action by liquids contained in the well.

A sleeve valve 32 is carried in the lead lining 31. At the top it is suspended from a ring 33 made of stainless steel, Monel metal or other corrosion resistant material. Handles 34 attached to opposite sides of ring 33 facilitate its rotation within the lining 31. The sleeve 32 has an opening 35 in the side conforming to the shape of the discharge from the chute 14. The sleeve 32 thus serves as a valve, as its rotation may be used to close the discharge from the chute. This is illustrated in Fig. 4 showing the temporary accumulation of the pellets 30 while the laden basket 27 is being lifted out by the yoke 29.

A second stand 36 supports a platform 37. This platform 37 encircles the tank 12. The platform is in the form of a ring with an opening above the tank. Supported upon the ring-shaped platform 37 is a melting pot 38. This melting pot has electrical heating elements 39 which are illustrated as being of an induction type connected to a source of electric current by leads 40.

The pot is surrounded by a shell 41 and the space between the wall of the pot and the shell is occupied by a mass of heat-insulating material 42.

A series of plugs 43 are screw threaded into the base 38, as more particularly illustrated in Figs. 5 and 7. Each plug is of the same corrosion resistant material as above described. Each plug has a vertical passageway 44 connected to a lateral passageway 45 and hence to a vertical discharge passageway 46. The plugs are bore laterally in line with the passageways 45 to produce enlarged bores 47. Each bore 47 carries the screw-threaded shank 48 of a needle valve 49. The needle valve 49 registers with the passageway 45 and can be adjusted to meter the discharge from the latter.

A threaded nipple 50 is fitted to the base of each plug 43 and projects below the latter. Axially, the nipple 50 carries a tube 51. This tube is cemented in the nipple 50. Tube 51 has a central bore 52 coincident with vertical passageway 46. The nipple 50 is of stainless steel or like corrosion resistant material. The tube 51 is of some suitable material which will not be wetted by the liquid solder. The preferred material for this tube is a glass resistant to temperature changes, for example, a Pyrex glass.

Any desired number of nozzle plugs may be used in the base of the melting pot 38.

Any suitable solder may be melted in the melting pot. The ordinary 50/50 solder may be used, although current practice is to use one which has a greater proportion of lead or other metal. For example, we have also used a solder containing 30 parts of tin to 70 parts of lead. Regardless of the particular ratio of the solder, the melting pot is maintained at a temperature of 25 degrees F. above the liquidus point of the solder selected. In the case of 50/50 solder the temperature will be approximately 455° to 460° F. in the case of 30/70 solder the preferred temperature is 525° F. In either case the temperature is materially below that required in the formation of leaden drop shot.

Solder has great weight and maintains high pressure, and "head" over the discharge passageway 44. This pressure moreover varies considerably dependent upon the level of the solder in the pot. In order to maintain a predetermined pressure in the discharge of the molten solder, it is, therefore, conducted through the metering needle valve 49. Here the adjustment of the valve serves to reduce the pressure so that the molten solder will drain freely through the lower passageway 46. The materials of which the plugs 43 are constructed are such that a minimum of wetting by the solder occurs and hence a minimum of friction or skin effect in flow. Moreover, this freedom to flow is enhanced by the provision of the glass tube 51. The glass material will not be wet by the solder. As a consequence, the solder which drips from the tube will form drops of relatively predetermined size. As a rule the drops will have a diameter slightly greater than twice the diameter of the bore 52 in the tube. In the preferred form the bore 52 of the tube 51 is 0.050''. This produces a normal drop of 0.125''. Experience has demonstrated that the diameter of 85% of the pellets thus formed will be within the range of 0.117'' and 0.133''.

The quenching bath 53 in the tank 12 and well 21 is used to control the form of the solder pellets. The rapidity of congelation is dependent upon the temperature. Thus for 50/50 solder the bath should be from 70 to 80° F., while for 30/70 solder a temperature of 120° F. is preferable. In general too low a temperature in the bath causes a small projection or tail to form at the top of the globule. If the temperature is too high, the shape formed is lenticular. This is contingent on the temperature of solder being not more than 25 to 30 degrees above its liquidus point, and a moderate temperature for the quenching bath, otherwise, the pellet may mushroom rather than coalesce into a spheroid.

The quenching bath is a water solution containing a fluxing compound. This may be any one of the standard fluxes known in the art. An example would be one in which zinc chloride and ammonium chloride are present in the form of a double salt, and there is also glycerine present. A concentration of 5% for the salt is usually selected. This bath has the property of preventing oxidation of the surface of the pellets as formed due to the deoxidizing action of the chloride. At the same time, the density of the solution is sufficiently high to offer more resistance on the fall of the pellets than would result from water alone. In this way the pellets are retarded in their fall until they congeal in relatively round form.

The form of the drops on tube 52 does not result in a round shape without some free fall. At the same time the fall may be too great for satisfactory production of the round form. Thus, if the falling distance is too short, a small projection is formed on the pellet; if the temperature is too high a small recess develops on the upper side of the pellet and it will spread out like a mushroom. However, if the distance of the fall is correctly determined, the shape of the pellet formed in the quenching bath is substantially round.

With a bore of 0.04'' for the tube 51 and the other conditions as stated above, a drop of 5/8'' will give satisfactory spheroidal pellets provided that the temperature and composition of the quenching bath are properly maintained. The quenching action which follows will maintain this shape providing the pellet is buoyed up by the density of the bath and the cooling effect is timed right. It is to be understood that the formation and congelation of the pellets occur in the upper end of the tank before they reach the inclined chute. In the lower part of their travel they are cooled and fall into the basket 27.

In addition to the pellet forming properties of the quenching bath, the presence of the fluxing compound prevents superficial oxidation of the pellets. The pellets removed from the basket 27 are graded for size and for satisfactory spheroidal shape. If the conditions of the quenching bath are selected as above indicated at least 85% of the pellets will be within the range indicated as satisfactory. The pellets are then dried and packed for use, storage or shipment.

In the drying of the pellets a slight amount of the fluxing compound from the solution remains on the surface of the solder pellet. This is indicated in Fig. 8. This has a material benefit in that the pellets may be used without the application of additional fluxing material when soldering is to be done.

The above description exemplifies our invention in the method and apparatus for making the solder pellets. The latter are thus formed rapidly under conditions which insure a product which it has not previously been possible to obtain.

The apparatus described is that preferred, but variation in proportions, materials and operating conditions may be made within the scope of the invention as defined in the following claims.

What we claim is:

1. The method of forming discrete spheroidal pellets of solder consisting of melting the solder, causing it to flow freely in measured drops and receiving them in a cooling coating solution of a solid fluxing compound.

2. The method of forming discrete spheroidal pellets of solder consisting of melting the solder, causing it to flow freely in measured drops into a coating solution of a solid fluxing compound and cooling the solution to control the rate of congelation of the drops into spheroidal form.

3. The method of forming discrete spheroidal pellets of solder, consisting of melting the solder, causing it to flow freely in measured drops, arresting the fall of the drops in a coating solution of a solid fluxing compound and cooling the solution to control the rate of congelation of the drops into spheroidal form.

4. The method of forming discrete spheroidal pellets of solder consisting of melting the solder, causing it to flow freely in measured drops and receiving them in a cooling coating solution of zinc chloride and ammonium chloride.

5. The method of forming discrete spheroidal pellets of solder consisting of melting the solder, causing it to flow freely in measured drops and receiving them in a cooling coating solution of zinc chloride, ammonium chloride and glycerine in water.

6. In combination, a melting-pot, a series of nozzles for discharging measured drops of solder from the pot, a quenching tank beneath the pot, a well, an inclined chute connecting the bottom of the tank with the well and means for temporarily closing the discharge from the chute to the well.

7. In combination, a melting-pot, a series of nozzles discharging measured drops of solder from the pot, a quenching tank beneath the pot, a well, an inclined chute connecting the bottom of the tank with the well and a sleeve valve for temporarily closing the discharge from the chute to the well.

WILLIAM C. STAMMER.
CALVIN R. BREDEN.

(References on following page)

REFERENCES CITED

The following references are of record in the file of this patent:

UNITED STATES PATENTS

| Number | Name | Date |
|---|---|---|
| 83,152 | Glasgow, Jr., et al. | Oct. 20, 1868 |
| 804,664 | Leisel | Nov. 14, 1905 |
| 1,378,084 | Bacon et al. | May 17, 1921 |
| 1,636,175 | Fay | July 19, 1927 |
| 1,711,807 | Preston | May 7, 1929 |
| 1,762,693 | Linebarger | June 10, 1930 |
| 1,903,329 | Beard | Apr. 4, 1933 |
| 2,113,279 | Olin | Apr. 5, 1938 |
| 2,137,931 | Craven et al. | Nov. 22, 1938 |
| 2,261,779 | Rutt | Nov. 4, 1941 |
| 2,287,029 | Dowdell | June 23, 1942 |
| 2,356,222 | Coxe | Aug. 22, 1944 |
| 2,431,611 | Durst | Nov. 25, 1947 |
| 2,436,211 | Hart | Feb. 17, 1948 |

FOREIGN PATENTS

| Number | Country | Date |
|---|---|---|
| 348,113 | Great Britain | May 6, 1931 |